US006135494A

United States Patent [19]
Lotito et al.

[11] Patent Number: 6,135,494
[45] Date of Patent: Oct. 24, 2000

[54] OCCUPANT PROXIMITY SENSOR WITH HORN SWITCH

[75] Inventors: James C. Lotito, Warren; Matthew W. Owen, Harper Woods; Raymond J. Vivacqua, Northville; Ronald A. Marker, deceased, late of Sterling Heights, all of Mich., by Aloysius Marker, legal representative

[73] Assignee: Breed Automotive Technology Inc., Lakeland, Fla.

[21] Appl. No.: 09/295,843

[22] Filed: Apr. 21, 1999

[51] Int. Cl.[7] .................................................... B60R 21/16
[52] U.S. Cl. ........................................... 280/731; 280/735
[58] Field of Search .................................... 280/731, 735

[56] References Cited

U.S. PATENT DOCUMENTS

| | | | |
|---|---|---|---|
| 5,178,409 | 1/1993 | Hiramitsu et al. | 280/731 |
| 5,520,412 | 5/1996 | Davis | 280/731 |
| 5,721,409 | 2/1998 | Enders | 280/731 |
| 5,722,686 | 3/1998 | Blackburn et al. | 280/735 |
| 5,961,144 | 10/1999 | Desmarais | 280/731 |

*Primary Examiner*—Kenneth R. Rice
*Attorney, Agent, or Firm*—Markell Seitzman

[57] ABSTRACT

A cover member (20) for a steering wheel mounted air bag module (14) is provided. The cover member (20) includes a horn switch (26) formed by a first conductive layer (30) defining a ground plane, and a second conductive layer (28) for contacting one side of the first conductive layer (30). The cover member (20) further includes a proximity sensor (24) formed by a third conductive layer (32) and a fourth conductive layer (34). The third and fourth conductive layers (32, 34) are electrically associated with the first conductive layer (30), and the proximity sensor (24) generates an electric field (50) in response to a signal received from a driver circuit (48).

20 Claims, 3 Drawing Sheets

OCCUPANT PROXIMITY SENSOR WITH HORN SWITCH

BACKGROUND AND SUMMARY OF THE INVENTION

The present invention relates generally to a sensor for a safety restraint system. In particular, the present invention is directed to an occupant proximity sensor which incorporates a horn switch within the steering wheel air bag module.

Safety restraint systems are used in motor vehicles for protecting the vehicle occupants during collisions. In addition to seatbelts, many safety restraint systems now include a driver-side air bag mounted within the steering wheel. To initially accommodate the air bag module within the central portion of the steering wheel, the vehicular horn activation switch or switches were moved toward the outer periphery and typically mounted to the support spokes of the steering wheel. However, this change presented a new location for the horn activation switches, as many drivers were accustomed depressing any portion of the central steering wheel cover for activating the vehicle's horn. Accordingly, several types of steering wheel air bag covers have been developed which include a horn switch which is more easily located and depressed before the impact in a potential collision situation.

In addition to a centrally located horn switch, it is also desirable to provide an occupant proximity sensor within the driver seating area for detecting whether the driver is correctly positioned within the passenger compartment. The prior art systems have attempted to locate the occupant proximity sensor within the instrument panel or seat assembly. While these systems work well for detecting driver position within the passenger compartment, they are less effective for detecting whether the driver or driver's hand is too closely positioned to the deployment zone of the steering wheel air bag. Therefore, a preferred alternative is to locate the occupant proximity sensor within the cover of the steering wheel air bag module. The proximity sensor can then more accurately detect whether an object is positioned too closely to the deployment zone of the air bag prior to activating the air bag.

Accordingly, it is desirable to provide an air bag cover for use with a steering wheel mounted air bag module which incorporates a horn switch and an occupant proximity sensor which is connected to the vehicle's crash management system. It is further desirable to provide such a device which reduces the total number of electrical contacts and the amount of metal foil required for creating the conductive layers of the proximity sensor and horn switch contacts. Additionally, it is desirable to include a predetermined tear zone which significantly reduces any exposed metal foil during and after air bag deployment.

The present invention is directed to a cover member for a steering wheel mounted air bag module. The cover member includes a horn switch formed by a first conductive layer defining a ground plane, and a second conductive layer for contacting one side of the first conductive layer. The cover member further includes a proximity sensor formed by a third conductive layer and a fourth conductive layer. The third and fourth conductive layers are electrically associated with the first conductive layer, and the proximity sensor generates an electric field in response to a signal received from a driver circuit.

BRIEF DESCRIPTION OF THE DRAWINGS

The various advantages of the present invention will become apparent to one skilled in the art by reading the following specification and appended claims, and by referencing the following drawings in which:

DETAILED DESCRIPTION OF THE DRAWINGS

Figure 1:
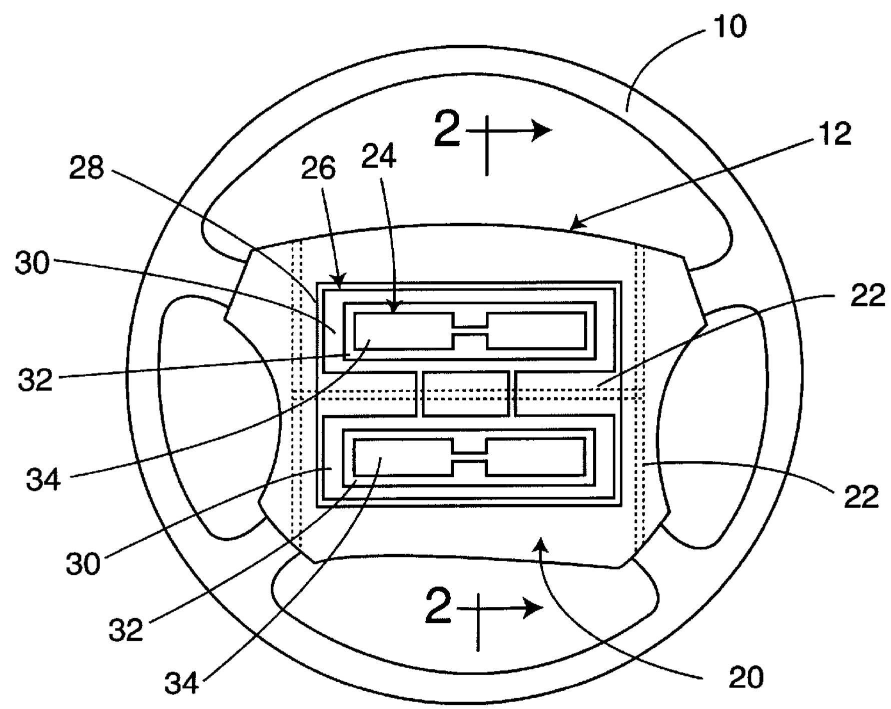
FIG. 1 is an environmental view of a steering wheel incorporating an occupant proximity sensor and horn switch into the air bag module cover in accordance with a preferred embodiment of the present invention.
Figure 2:
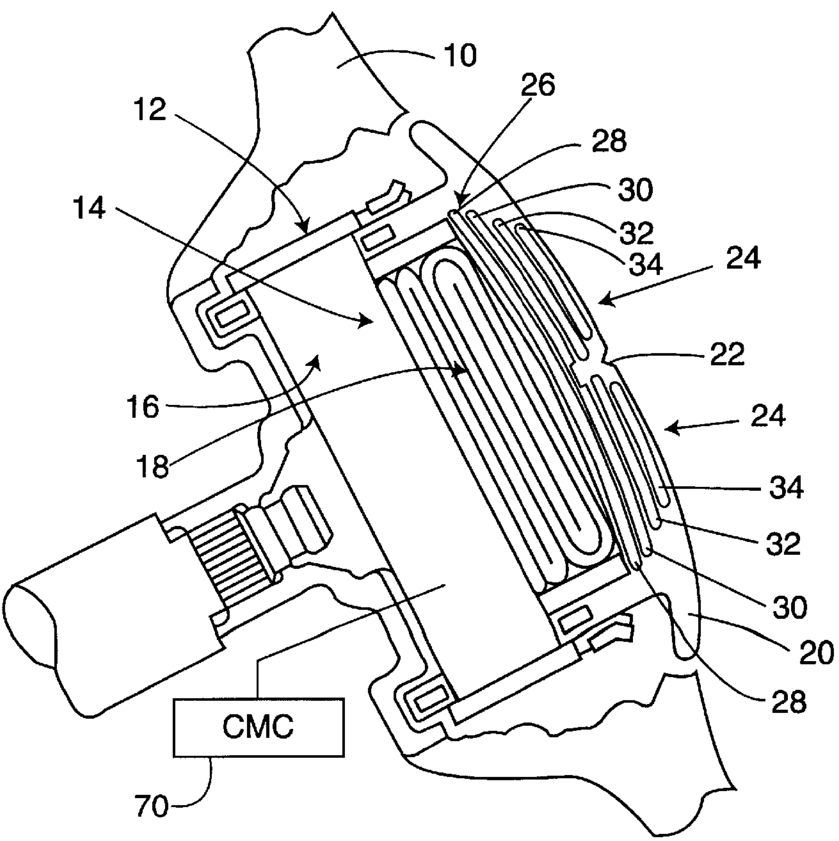
FIG. 2 is a partial cross-sectional view of the air bag module cover taken along line 2—2 of FIG. 1.

In general, the present invention is directed to an occupant proximity sensor and horn switch which can be integrated into the cover for an air bag module. With reference to FIG. 1, steering wheel 10 is shown which includes an air bag module housing 12 for accommodating a steering wheel air bag module 14. As seen in FIG. 2, air bag module 14 includes a pyrotechnic inflator 16 for deploying an air bag 18 during a crash scenario. Preferably, inflator 16 which is actuated by the vehicle's crash management controller, is capable of deploying air bag 18 with a range of deployment forces. As such, inflator 16 may be a hybrid-type inflator having two separate stored energy devices, or a single-level inflator having a valve or other type of electronically actuated regulating device for controlling the pressure and mass flow of the inflation gases discharged from inflator 16.

With reference to FIGS. 1 and 2, air bag module cover 20 is shown to include a capacitive proximity sensor 24 and a horn switch 26. Air bag module cover 20 also includes a tear seam 22 which is preferably molded therein and forms an "H" or other pattern as indicated by the dashed lines. The tear seam can also be configured as an "I" or "U" shaped pattern. The frangible area defined by tear seam 22 allows the perforation of air bag module cover 20 along tear seam 22 during the deployment of air bag 18. As shown, horn switch 26 is generally defined by a horn switch conductor 28 and a ground plane conductor 30. An air gap 42 is provided between conductors 28, 30 which defines a uniform gap therebetween. Preferably, conductors 28 and 30 are formed from a thin metal foil, approximately 0.25–0.50 mm (10–20 mils) in thickness which defines a membrane switch within air bag module cover 20 for activating the vehicle's horn 38.

The capacitive proximity sensor 24 is generally defined by the opposing surface of ground conductor 30, a shield conductor 32 disposed on top of and generally parallel to ground conductor 30, and a sensor conductor 34 disposed generally parallel to shield conductor 32. It is also preferred that conductors 32 and 34 are formed from a thin metal foil, approximately 0.25 mm in thickness. Accordingly, the structure of ground conductor 30, shield conductor 32 and sensor conductor 34 forms a three-plate capacitor which can be connected to a proximity sensor circuit 48 for detecting the presence and/or position of an object 52 in front of air bag module 14 and steering wheel 10.

FIG. 1 discloses the approximate location of capacitive proximity sensor 24 within air bag module cover 20. However, one skilled in the art will appreciate that proximity sensor 24 and horn switch 26 can take on a variety of sizes to accommodate different manufacturing specifications for air bag module cover 20. FIG. 2 discloses the curved profile of proximity sensor 24 and horn switch 26. The thin conductive material used in forming conductors 28, 30, 32 and 34 allow the integration of these components within a conventional plastic or flexible air bag module cover 20 having a thickness of approximately 2–4 millimeters. Accordingly, it will be appreciated that the construction technique for proximity sensor 24 and horn switch 26 allow these components to be integrated within a wide range of curved or flat air bag module covers 20 without significantly increasing the overall thickness of the cover.

Figure 3:
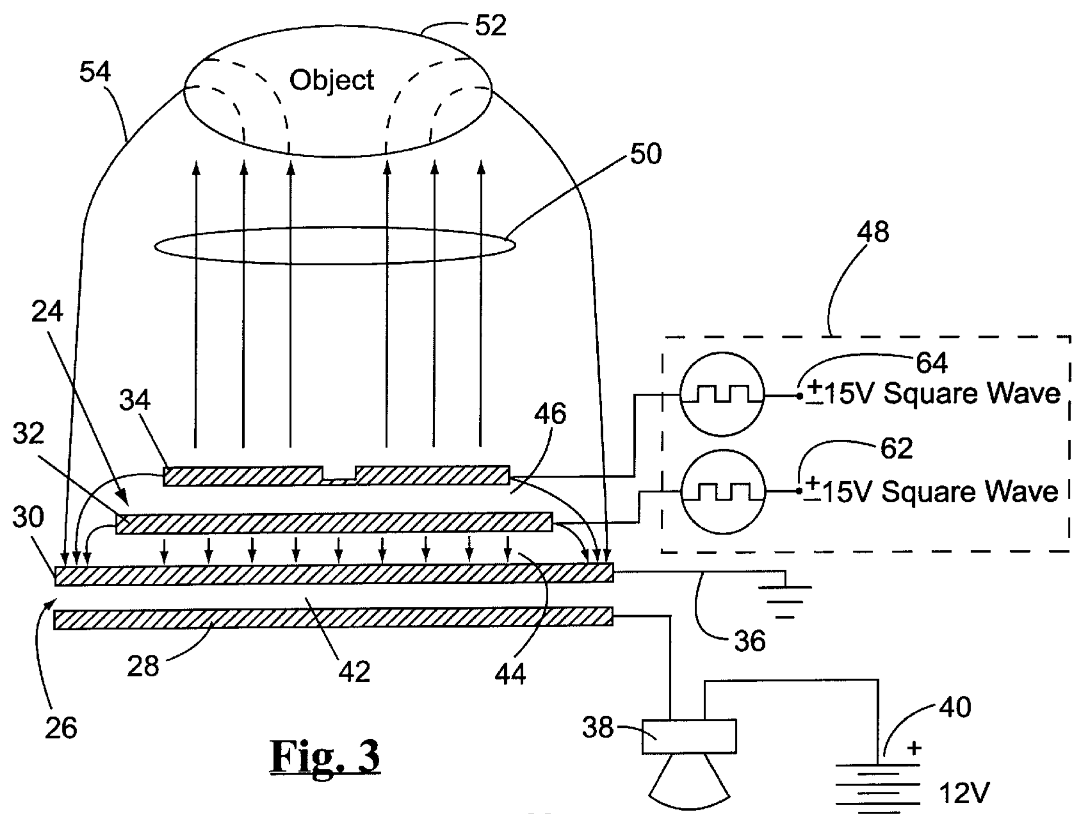
FIG. 3 is a schematic diagram showing a side view of the occupant proximity sensor and horn switch also in accordance with the preferred embodiment of the present invention.

The proximity sensor 24 used in the preferred embodiment of the present invention is a capacitive proximity sensing element, sometimes referred to as a capaciflector. With reference to FIG. 3, a schematic diagram and circuit model for proximity sensor 24 and horn switch 26 is shown with their various electrical interconnections. As shown, ground plane conductor 30 is connected to the vehicle ground 36. The horn switch conductor 28 is connected to one terminal of the vehicle horn 38. A second terminal of the vehicle horn 38 is connected to the vehicle's 12V power supply 40. An air gap 42 provides the necessary separation between horn switch conductor 28 and ground plane conductor 30. Accordingly, electrical contact between horn switch conductor 28 and ground plane conductor 30 completes the electrical circuit for activating horn 38.

As previously discussed, proximity sensor or capaciflector 24 includes three conductive members with dielectric layers disposed therebetween. More specifically, a first dielectric layer 44 is disposed between ground plane conductor 30 and shield conductor 32. A second dielectric layer 46 is disposed between shield conductor 32 and sensor conductor 34. Preferably, first and second dielectric layers 44 and 46 have a thickness of approximately 15 mils. As disclosed, the shield conductor 32 and sensor conductor 34 are connected to separate nodes of a proximity sensor driver circuit 48. Each node of driver circuit 48 then receives a plus/minus 15 volt square wave driver signal. Accordingly, the shield conductor 32 is driven in phase with the sensor conductor 34. Additionally, the sensor conductor 34 is maintained at a voltage potential that is at least equal to or higher than the potential of the shield conductor 32.

In operation, the sensor 34 reflects electric field lines 50 away from the ground plane conductor 30 and toward a field intruding object 52. The circuit model for the capaciflector 24 assumes that the object 52 is grounded and therefore at the same potential as ground plane conductor 30. When the shield 32 and the sensor 34 are energized, an extended electric field, generally indicated by electric field line 50, is produced. This electric field 54 can extend several feet beyond the capacitive proximity sensor 24 depending upon the voltages applied to the shield 32 and sensor 34. When the object 52 is introduced into the field 50, a negative electric charge is induced on the surface of the object 52. Therefore, the surface of object 52 effectively becomes a capacitive electrode of the proximity sensor 24 in conjunction with the sensor conductor 34. As object 52 moves toward or away from sensor 34, the capacitive value therebetween changes. Accordingly, this change in capacitance value or the electronic effect produced by this change in capacitance can be measured by proximity sensor circuit 48 for detecting the relative position or change in position of object 52.

As shown, shield conductor 32 is wider than sensor conductor 34. This generates the electric field distribution as shown in FIG. 3 where it can be seen that conductor 32 shields the sensor conductor 34 from ground plane conductor 30. Accordingly, shield conductor 32 operates by concentrating the electric field 50 between sensor 34 and the object 52, with little, if any, of the field 50 returning directly to ground plane conductor 30 (due to the effects of parasitic capacitance). The sensor conductor 34 is thus shielded from nearby ground, (i.e., the ground plane conductor 30), such that the capacitance between sensor 34 and the ground plane 30 is substantially reduced if not eliminated. Therefore, the shield conductor 32 forces the field lines 50 from the sensor conductor 34 toward the object 52 as much as possible as shown in FIG. 3. This technique significantly increases the operating range of capacitive proximity sensor 24. Additionally, it should be understood that horn switch conductor 28 is not part of, and has no effect upon the operation of capacitive proximity sensor 24. The horn switch can be used to directly activate the horn or connected to a high voltage rely that activates the horn.

Figure 4:
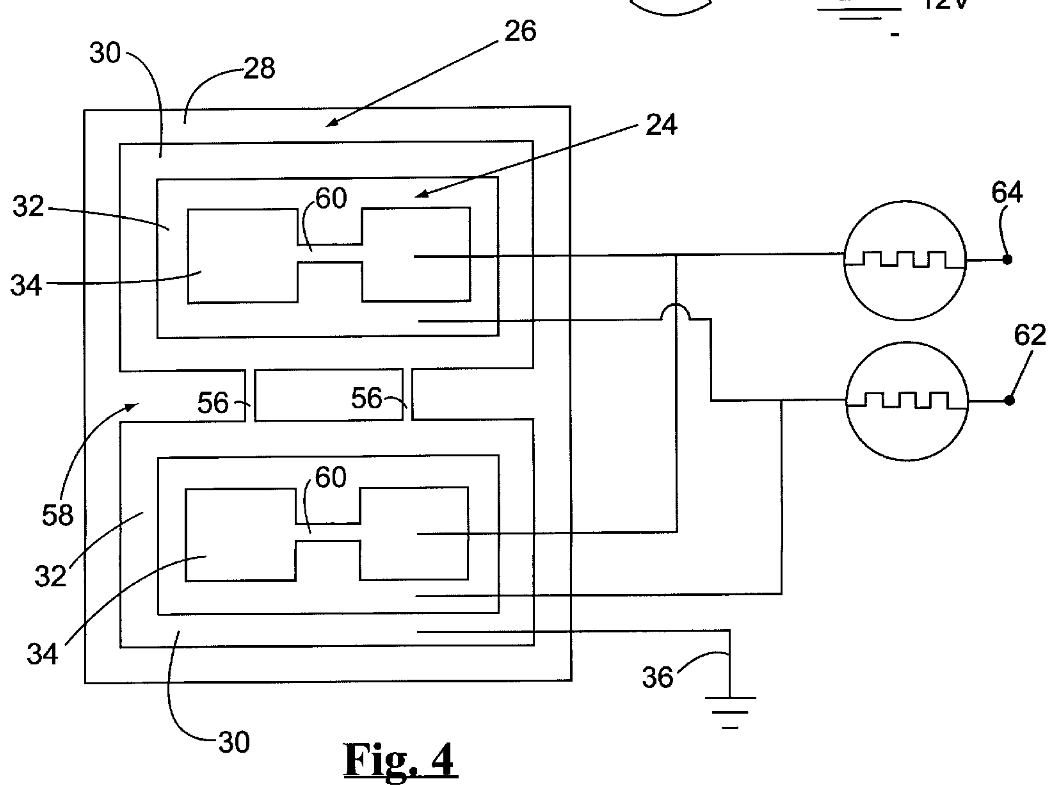
FIG. 4 is a top schematic view showing the physical layout of the various conductors associated with the occupant proximity sensor also in accordance with a preferred embodiment of the present invention.

With reference now to FIG. 4, the relative physical proportions of the conductive layers forming proximity sensor 24 and horn switch 26 are shown. While not specifically shown in FIG. 4, it should be understood that in the preferred embodiment, first and second dielectric layers 44, 46 are disposed between the conductors of capacitive proximity sensor 24. As disclosed, the horn switch conductor 28 is positioned at the bottom and/or rear of the assembly, and also occupies the largest area of the four conductive layers. The ground plane conductor 30 is positioned above or in front of horn switch conductor 28.

In a preferred embodiment, the ground plane layer 30 is actually two separate conductors disposed in and along the same plane. These separate conductors are electrically connected by a pair of bridge conductors 56 which cross a seam area 58. Accordingly, only a minimal amount of conductive material associated with ground plane layer 30 is contained within seam area 58. Bridge conductors 56 also allow both sections of ground plane layer 30 to be maintained at the same ground potential by using one ground connector 36. A pair of shield conductors 32 which occupy a smaller area than the ground plane conductors 30 is disposed above or in front of the ground conductors 30 and is separated therefrom by the first dielectric layer 44, preferably the same material from which air bag module cover 20 is formed or molded. The shield conductors 32, while disposed in the same plane, must be separately connected to node 62 of driver circuit 48. Finally, a pair of sensor conductors 34 occupying yet a smaller area are positioned above the shield conductors 32 and separated therefrom by the second dielectric layer 46, also preferably the same material comprising air bag module cover 20. A pair of individual connectors is provided to the separate sensor conductors 34 for connection to node 64 of driver circuit 48.

As specifically shown, each sensor conductor 34 comprises two individual sensor sections which are joined via a bridge connector 60. This design provides several benefits to capacitive proximity sensor 24. More specifically, the narrower width of connector 60 increases the frontal area or exposure of shield conductor 32, which in turn serves to increase the concentration of field lines 50 toward object 52. Additionally, bridge connector 60 provides additional flexibility to proximity sensor 24, which allows air bag module cover 20 to be deflected more easily for moving ground plane conductors 30 into electrical contact with horn switch conductor 28.

Figure 5:
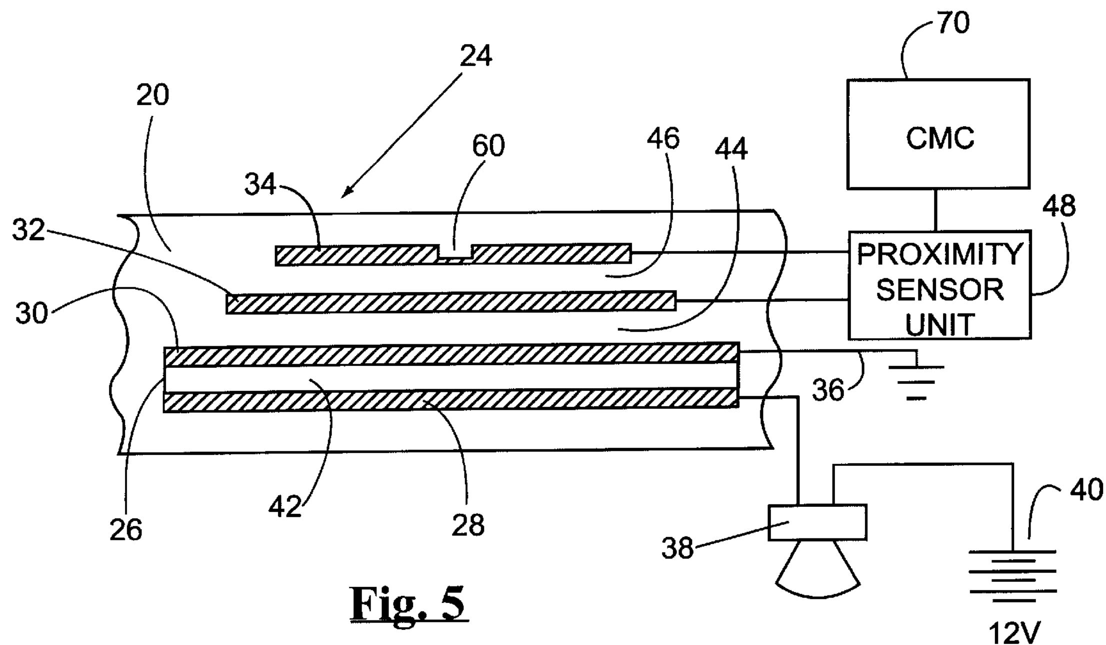
FIG. 5 is a partial sectional view showing the preferred construction of the air bag module cover in accordance with the present invention.
Figure 6:
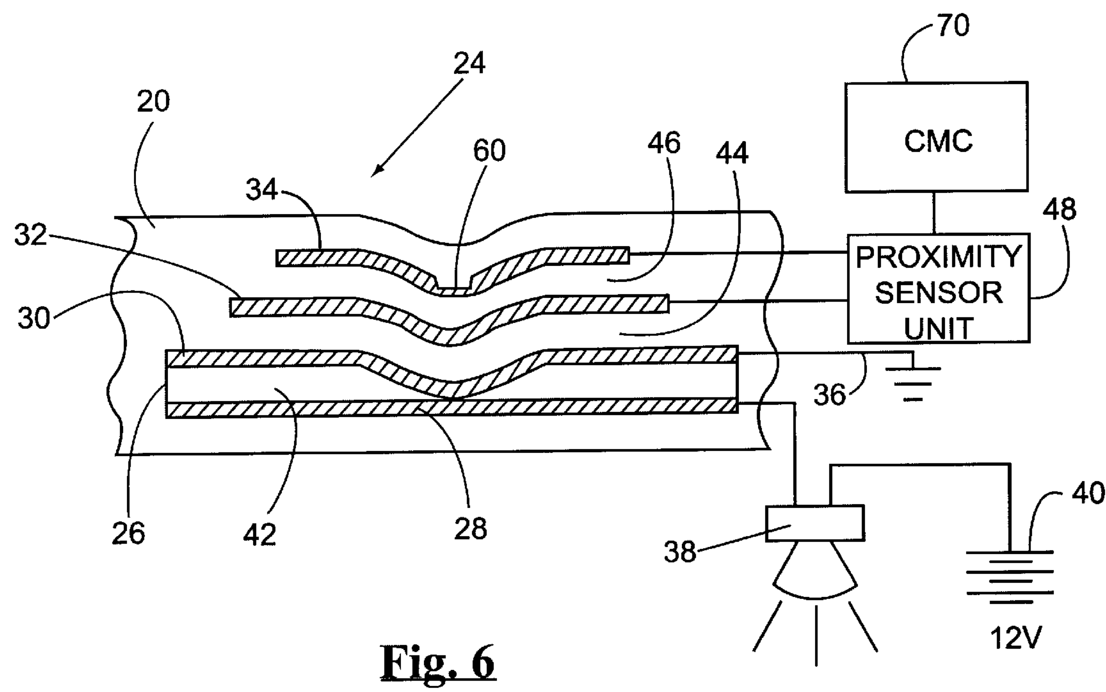
FIG. 6 is a partial sectional view showing the air bag module cover and horn switch in an actuated state.

Turning now to FIGS. 5 and 6, the operation of the capacitive proximity sensor 24 and horn switch 26 of the present invention is described in more detail. More specifically, FIG. 5 illustrates air bag module cover 20 and horn switch 26 in the nonactuated state. During vehicle operation, proximity sensor 24 is active and is constantly providing occupant position information signals to the vehicle's crash management controller (CMC) 70 by way of proximity sensor circuit 48. The change in capacitance valve as object 52 moves with respect to proximity sensor 24 produces a detectable change in the driver signals produced by proximity sensor circuit 48, and may be detected using a variety of techniques known within the art. When proximity sensor circuit 48 detects that the object 52 is too close to the deployment zone being monitored by proximity sensor 24, a signal is sent to CMC 70 to indicate same. During normal operating conditions, the vehicle operator can be alerted that they are too close to the deployment zone of the air bag 18. Preferably, this alert is provided by CMC 70 as a visual warning light or an audible warning signal which continues until a sufficient distance from the deployment zone is detected. However, if the vehicle operator is too close during a collision or impact situation and proximity sensor circuit 48 detects this condition, CMC 70 may deploy air bag 18 with reduced force by controlling the output generated by air bag inflator 16. This may be achieved in several ways as described above.

As shown in FIG. 6, when air bag module cover 20 is depressed or deflected by the vehicle operator, ground plane conductor 30 makes electrical contact with horn switch conductor 28 for activating the vehicle's horn 38. It should be understood that air bag module cover 20 provides sufficient flexibility for allowing horn 38 to be easily activated, while also maintaining an elastic memory which allows the electrical contact of horn switch 26 to be "opened" when pressure on air bag module cover 20 is released for deactivating horn 38. When horn switch 26 is activated, proximity sensor circuit 48 can detect the presence of the vehicle operator's hand within the air bag deployment zone, and signal CMC 70 of the occurrence of this condition. If a crash were to occur while horn switch 26 is being activated, CMC 70 can then deploy air bag 18 with reduced force as previously described.

Accordingly, it will be appreciated by one skilled in the art that the proximity sensor and horn switch associated with the present invention provides a low profile sensor assembly which can be integrated within conventional flexible plastic covers such as air bag module cover 20. The feature providing a common ground plane conductor 30 which operates in conjunction with both proximity sensor 24 and horn switch 26 eliminates an additional layer of conductive material from the assembly. Thus, the present invention allows for more efficient manufacturing of an air bag module cover at a lower cost. This technique also allows the conventional horn switch buttons to be removed from the steering wheel spokes and the horn activation switch placed into a position which is more easily and instinctively located by the vehicle operator. Finally, the present invention allows an occupant proximity sensor to be incorporated within the steering wheel for detecting objects which are too close to the air bag deployment zone If such a condition is detected, the vehicle operator may be notified either visually or with an audible warning signal.

The foregoing discussion discloses and describes exemplary embodiments of the present invention. One skilled in the art will readily recognize from such discussion, and from the accompanying drawings and claims, that various changes, modifications and variations can be made therein without departing from the spirit and scope of the invention as defined in the following claims.

What is claimed is:

1. A cover member (20) for a steering wheel mounted air bag module (14) comprising:

a horn switch (26) formed by a first conductive layer (30) defining a ground plane, and a second conductive layer (28) for contacting one side of the first conductive layer (30); and a proximity sensor (24) formed by a third conductive layer (32) and a fourth conductive layer (34), wherein the third and fourth conductive layers (32, 34) are electrically associated with the first conductive layer (30), the proximity sensor (24) generating an electric field (50) in response to a signal received from a driver circuit (48).

2. The cover member of claim 1 wherein the third conductive layer (32) operates as a shield for isolating the fourth conductive layer (34) from an electrical potential associated with the first conductive layer (30).

3. The cover member of claim 1 wherein the fourth conductive layer (34) generates the electric field (50) and directs the electric field (50) toward an object (52) positioned in front of the proximity sensor (24).

4. The cover member of claim 1 wherein the first conductive layer (30) and the second conductive layer (28) are surrounded by a flexible material (20) forming the cover member (20) for defining a membrane switch (26).

5. The cover member of claim 1 further including a frangible seam (22) which may be separated during the deployment of an air bag (18).

6. The cover member of claim 1 wherein a dielectric layer (44) is disposed between the first conductive layer (30) and the third conductive layer (32).

7. The cover member of claim 1 wherein a dielectric layer (46) is disposed between the third conductive layer (32) and the fourth conductive layer (34).

8. The cover member of claim 1 wherein the first conductive layer (30) includes a first section and a second section interconnected by a conductive bridge section (56).

9. The cover member of claim 1 wherein electrical contact between the first and second conductive layers (30, 28) completes an electrical circuit for activating a vehicular horn (38).

10. A flexible cover member (20) for a steering wheel mounted air bag module (14) comprising:

a first conductive layer (30) defining a ground plane;

a second conductive layer (28) disposed generally parallel to the first conductive layer (30) and positioned within the cover member (20) so that an air gap (42) exists between the first and second conductive layers (30, 28) for defining an electrical switch (36) in a normally open position;

a third conductive layer (32) disposed adjacent to the first conductive layer (30) on a side opposite the second conductive layer (28);

a fourth conductive layer (34) disposed adjacent to the third conductive layer (32), the third and fourth conductive layers (32, 34) defining a capacitive proximity sensor (24) within the cover member (20); and a driver circuit (48) connected to the third and fourth conductive layers (32, 34) and providing a signal to the capacitive proximity sensor (24) for generating an electric field (50) for interacting with an object (52) positioned in front of the fourth conductive layer (34).

11. The cover member of claim 10 wherein the driver circuit (48) is operable for detecting the change in capacitance between the object (52) and the capacitive proximity sensor (24).

12. The cover member of claim 10 wherein electrical contact between the first and second conductive layers (30, 28) completes an electrical circuit for activating a vehicular horn (38).

13. The cover member of claim 10 wherein the third conductive layer (32) operates as a shield for isolating the fourth conductive layer (34) from an electrical potential associated with the first conductive layer (30).

14. The cover member of claim 10 wherein the fourth conductive layer (34) generates the electric field (50) and directs the electric field (50) toward the object (52).

15. The cover member of claim 10 wherein the first conductive layer (30) and the second conductive layer (28) are surrounded by a flexible material (20) forming the cover member (20) for defining a membrane switch (26).

16. The cover member of claim 10 wherein the first conductive layer (30) includes a first section and a second section interconnected by a conductive bridge section (56).

17. The cover member of claim 16 further including a frangible seam (22) disposed between the first and second sections of the first conductive layer (30) which may be separated during the deployment of an air bag (18).

18. A cover member (20) for a steering wheel air bag module (14) for integrating a capacitive proximity sensor (24) and a horn switch (26) comprising:

a flexible substrate (20) having a plurality of electrically active components molded therein;

a ground plane conductor (30) defined by a first section and a second section which are electrically coupled by a bridge connector (56), the first and second sections being separated by a seam area (58);

a frangible seam (22) formed within the flexible substrate (20), and along the seam area (58);

a conductive layer (28) disposed behind the ground plane (30) and positioned within the cover member (20) so that an air gap (42) exists between the ground plane (30) and the conductive layer (28) defining a horn switch (36) for activating a vehicular horn (38);

a conductive shield (32) disposed in front of the ground plane conductor (30), the shield (32) occupying an area less than the ground plane conductor (30);

a conductive sensor (34) disposed in front of the conductive shield (32), the sensor (34) occupying an area less than the shield (32); and a driver circuit (48) connected to the conductive shield (32) and the conductive sensor (34) for providing a time variant signal thereto.

19. The cover member of claim 18 wherein the conductive shield (32) is defined by a first shield member and a second shield member, the first and second shield members being connected to a common node (62) of the driver circuit (48).

20. The cover member of claim 18 wherein the conductive sensor (34) is defined by a first sensor member and a second sensor member, each of the first and second sensor members including a pair of sensor plates coupled by a bridge connector (60), the first and second sensor members being connected to a common node (64) of the driver circuit (48).

* * * * *